UNITED STATES PATENT OFFICE.

WILLIAM PAQUETTE, OF LEWISTON, MAINE.

COSMETIC.

SPECIFICATION forming part of Letters Patent No. 453,847, dated June 9, 1891.

Application filed March 14, 1891. Serial No. 385,104. (No specimens.)

*To all whom it may concern:*

Be it known that I, WILLIAM PAQUETTE, a citizen of the United States, residing at Lewiston, in the county of Androscoggin and State of Maine, have invented certain new and useful Improvements in Cosmetics; and I do declare the following to be a full, clear, and exact description of the invention, such as will enable others skilled in the art to which it appertains to make and use the same.

My composition consists of the following ingredients combined in the proportions stated: viz., pure water, one quart; cinnamon-oil, four drops; alcohol, one ounce; pulverized alum, one ounce; Epsom salts, one ounce. These ingredients are to be thoroughly mingled by agitation.

In using the above-named composition the pores of the face should be thoroughly opened and cleansed by washing with hot water and white castile-soap, using a sponge. Rinse with hot water and dry thoroughly with soft towel and by rubbing with the palms of the hands. Then apply the composition to the face and affected parts with a sponge. This should be done before retiring. In the morning wash again with hot water and white castile-soap. Rinse, as before, with hot water. This opens the pores and cleanses them from all impurities and oily secretions. Then rinse with cold water. Dry, as before, with soft towel and by rubbing with the palms of the hands. Then apply the composition before going out into the air.

By the use of the above composition the sunburns, freckles, and blotches are quickly removed, the moles, pimples, and disagreeable eruptions disappear, and the skin becomes soft and white.

What I claim, and desire to secure by Letters Patent of the United States, is—

The herein-described composition of matter to be used as a cosmetic, consisting of water, oil of cinnamon, alcohol, pulverized alum, and Epsom salts, in the proportions specified.

In testimony whereof I affix my signature in presence of two witnesses.

WILLIAM PAQUETTE.

Witnesses:
 FRANK A. CONANT,
 ABRAM G. DURRELL.